(12) United States Patent
Moriya

(10) Patent No.: US 10,482,640 B2
(45) Date of Patent: Nov. 19, 2019

(54) IMAGE PROCESSING APPARATUS FOR CLIPPING A PART OF AN IMAGE AND DISPLAYING SAME

(71) Applicant: CASIO COMPUTER CO., LTD., Shibuya-ku, Tokyo (JP)

(72) Inventor: Takahiro Moriya, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 157 days.

(21) Appl. No.: 15/446,238

(22) Filed: Mar. 1, 2017

(65) Prior Publication Data

US 2017/0294038 A1 Oct. 12, 2017

(30) Foreign Application Priority Data

Apr. 7, 2016 (JP) .................................. 2016-077206
Feb. 3, 2017 (JP) .................................. 2017-018285

(51) Int. Cl.
| | | |
|---|---|---|
| *G06T 11/60* | (2006.01) | |
| *G06T 3/40* | (2006.01) | |
| *H04N 5/232* | (2006.01) | |
| *H04N 5/262* | (2006.01) | |

(52) U.S. Cl.
CPC ............... *G06T 11/60* (2013.01); *G06T 3/40* (2013.01); *H04N 5/23219* (2013.01); *H04N 5/23229* (2013.01); *H04N 5/23293* (2013.01); *H04N 5/2628* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 7,835,550 B2 | 11/2010 | Tamaru | |
| 8,228,550 B2 | 7/2012 | Terada | |
| 9,832,329 B2* | 11/2017 | Tamaki | H04N 1/00456 |
| 2005/0190406 A1* | 9/2005 | Yonaha | G06T 7/0004 |
| | | | 358/1.18 |
| 2006/0274960 A1* | 12/2006 | Tamaru | G06F 17/3028 |
| | | | 382/274 |
| 2008/0108028 A1* | 5/2008 | Lou-Hsiao | G09B 1/16 |
| | | | 434/157 |
| 2008/0253690 A1* | 10/2008 | Askelof | G06T 3/403 |
| | | | 382/295 |
| 2010/0014719 A1* | 1/2010 | Date | G11B 27/28 |
| | | | 382/118 |

(Continued)

FOREIGN PATENT DOCUMENTS

| | | |
|---|---|---|
| JP | 2000276484 A | 10/2000 |
| JP | 2004012633 A | 1/2004 |

(Continued)

*Primary Examiner* — Jwalant Amin
(74) *Attorney, Agent, or Firm* — Holtz, Holtz & Volek PC

(57) ABSTRACT

A control section performs control of displaying a plurality of different original images in a list form on a touch display section, clips a part of at least one of the plurality of different original images displayed in the list form in response to the detection of a second instruction operation by the user, acquires the clipped image, and performs control of displaying the clipped and acquired image in place of its original image displayed in the list form and subjected to the clipping, with the display size of the original image being maintained.

11 Claims, 13 Drawing Sheets

(56) References Cited

U.S. PATENT DOCUMENTS

2014/0192081 A1* 7/2014 Jin .......................... G06K 9/80
345/625

FOREIGN PATENT DOCUMENTS

| JP | 2005269563 A | 9/2005 |
| JP | 2007019678 A | 1/2007 |
| JP | 2008015854 A | 1/2008 |

* cited by examiner

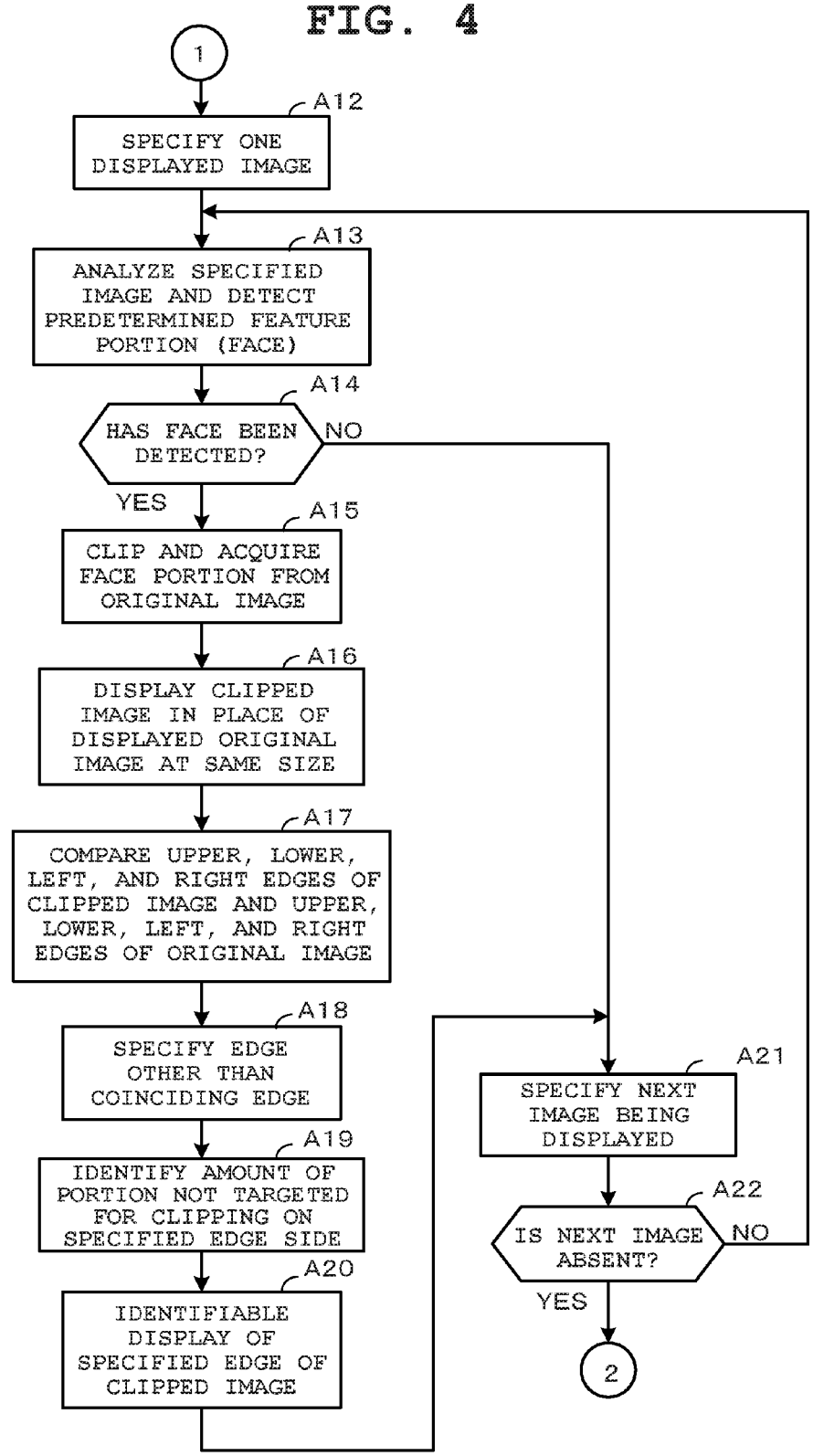

B BUTTON

B BUTTON

B BUTTON

B BUTTON

B BUTTON

B BUTTON

C BUTTON

C BUTTON

C BUTTON

ORIGINAL IS LANDSCAPE-ORIENTED IMAGE

CUT OFF PORTION

ORIGINAL IS PORTRAIT-ORIENTED IMAGE

CUT OFF PORTION

ORIGINAL IS SQUARE IMAGE

IMAGE PROCESSING APPARATUS FOR CLIPPING A PART OF AN IMAGE AND DISPLAYING SAME

CROSS-REFERENCE TO RELATED APPLICATIONS

This application is based upon and claims the benefit of priority from the prior Japanese Patent Applications No. 2016-077206, filed Apr. 7, 2016 and No. 2017-018285, filed Feb. 3, 2017, the entire contents of which are incorporated herein by reference.

BACKGROUND OF THE INVENTION

1. Field of the Invention

The present invention relates to an image display apparatus and an image display control method for clipping a part of an image and displaying same.

2. Description of the Related Art

Conventionally, a function for reducing the size of a plurality of images to a predetermined size for list display has been widely used. In some cases, the size of an image to be displayed can be selected from, for example, large, medium, and small sizes, or can be changed by using a slide bar or the like. Also, for example, a technique has been disclosed in which the size of each image is adjusted to an appropriate size for collective display, as described in Japanese Patent Application Laid-Open (Kokai) Publication No. 2004-012633.

SUMMARY OF THE INVENTION

In accordance with one aspect of the present invention, there is provided an image display apparatus comprising: a display unit; and a processor that is configured to: perform control of displaying a plurality of different original images in a list form on the display unit; clip a part of at least one of the plurality of different original images displayed in the list form in response to detection of a second instruction operation by a user; acquire a clipped image; and perform control of displaying the clipped and acquired image in place of an original image displayed in the list form and subjected to the clipping, with a display size of the original image being maintained.

In accordance with another aspect of the present invention, there is provided an image display apparatus comprising: a display unit; and a processor that is configured to: perform control of displaying a plurality of different images in a list form on the display unit; and perform control of switching current list display to list display where a plurality of different images whose number is more than number of the currently displayed images are displayed on the display unit at a display size smaller than a display size of the currently displayed images, every time a first instruction operation by a user is detected.

In accordance with another aspect of the present invention, there is provided an image display apparatus comprising: a display unit; and a processor that is configured to: clip a part of at least one of a plurality of different original images; acquire a clipped image; and perform control of displaying the clipped and acquired image in a list form such that a clipping position on an original image subjected to the clipping is identifiable.

In accordance with another aspect of the present invention, there is provided an image display control method for an image display apparatus, comprising: performing control of displaying a plurality of different original images in a list form on a display unit; clipping a part of at least one of the plurality of different original images displayed in the list form in response to detection of an instruction operation by a user; acquiring a clipped image; and performing control of displaying the clipped and acquired image in place of an original image displayed in the list form and subjected to the clipping, with a display size of the original image being maintained.

In accordance with another aspect of the present invention, there is provided an image display control method for an image display apparatus, comprising: performing control of displaying a plurality of different images in a list form on a display unit; and performing control of switching current list display to list display where a plurality of different images whose number is more than number of the currently displayed images are displayed on the display unit at a display size smaller than a display size of the currently displayed images, every time an instruction operation by a user is detected.

In accordance with another aspect of the present invention, there is provided an image display control method for an image display apparatus, comprising: performing control of displaying a plurality of different original images in a list form on a display unit; clipping a part of at least one of the plurality of different original images; acquiring a clipped image; and performing control of displaying the clipped and acquired image on the display unit in place of an original image displayed in the list form and subjected to the clipping such that a clipping position on the original image is identifiable.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 4 is a flowchart of an operation following the operation of FIG. 3;

DETAILED DESCRIPTION OF THE PREFERRED EMBODIMENTS

An embodiment of the present invention will hereinafter be described with reference to FIG. 1 to FIG. 6B.

Figure 1:
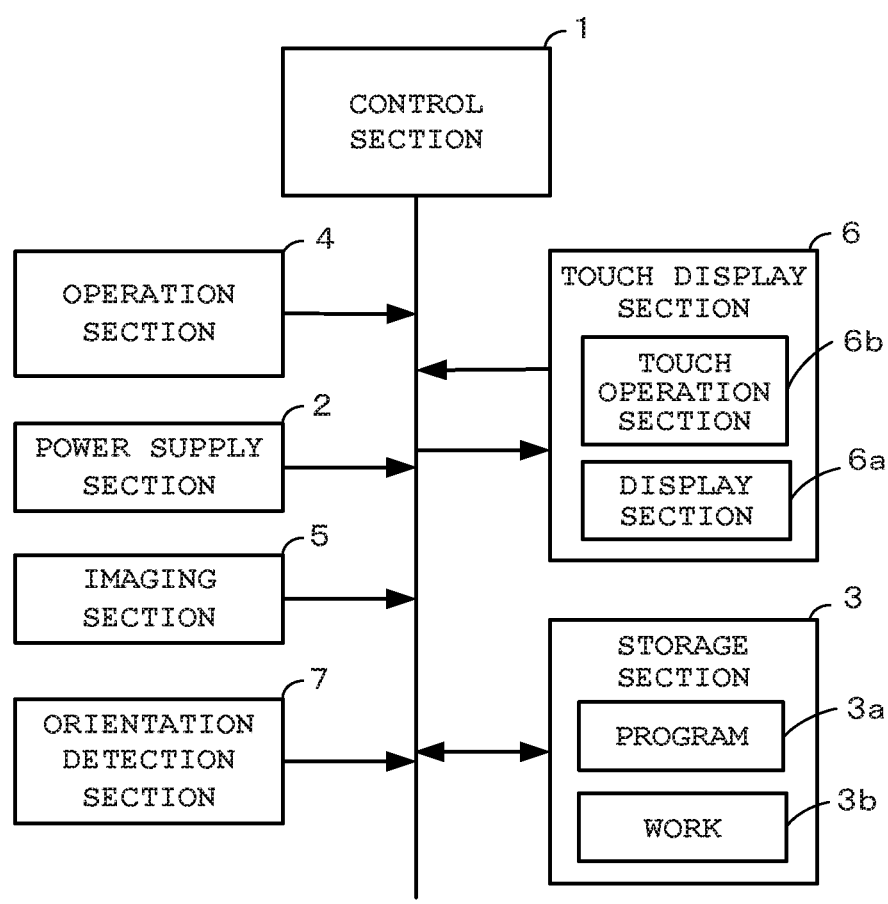
FIG. 1 is a block diagram showing basic components of a digital camera where the present invention has been applied as an image display apparatus.

FIG. 1 is a block diagram showing basic components of a digital camera where the present invention has been applied as an image display apparatus.

This image display apparatus (digital camera) has an imaging function capable of photographing a subject with high definition, an image replay function for reading and replaying an arbitrary image (stored image) captured and stored. A control section 1 thereof operates by power supply from a power supply section (secondary battery) 2 and controls the entire operation of this imaging apparatus in accordance with various programs stored in a storage section 3. In this control section 1, a CPU (Central Processing Unit), memory, and the like (not shown) are provided.

Figure 3:
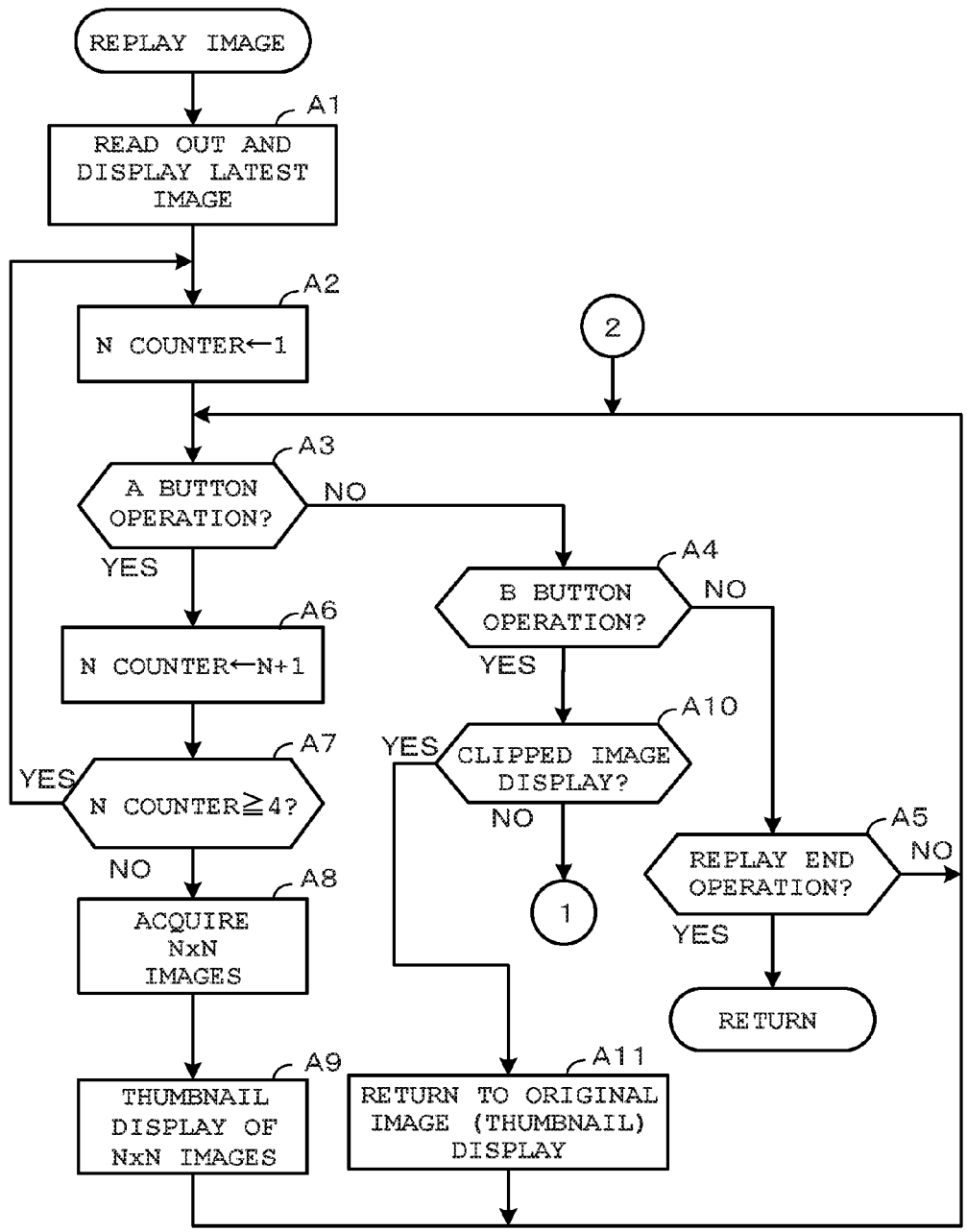
FIG. 3 is a flowchart for describing an operation (characteristic operation of the present embodiment) of the digital camera which is started when a current mode is switched to a replay mode.

The storage section 3 is structured to have, for example, a ROM (Read Only Memory) and a flash memory, and includes a program memory 3a having stored therein a program for achieving the present embodiment in accordance with an operation procedure shown in FIG. 3 and FIG. 4, various applications, and the like, and a work memory 3b in which a flag and the like are temporarily stored. The storage section 3 may be structured to include a removable portable memory (recording medium) such as an SD (Secure Digital) card or a USB (universal serial bus) memory and, although not shown, may be structured to include a storage area on a predetermined server apparatus side in a case where the camera is connected to a network via a communication function.

Although omitted in the drawing, an operating section 4 in FIG. 1 includes various keys such as a power supply key for turning a power supply ON/OFF and a mode change key for switching between, for example, a mode for image capturing (REC mode) and a mode for replaying a captured image (stored image) (PLAY mode). In response to a key operation, the control section 1 performs, for example, mode change processing, image capture processing, replay processing, and the like. An imaging section 5 in FIG. 1 has, although not shown, an imaging lens, an image sensor such as a CCD (Charge-Coupled Device) or CMOS (Complementary Metal Oxide Semiconductor), various sensors, an analog processing section, and a digital processing section. An image captured by this imaging section 5 is subjected to image compression processing by the control section 1 so as to be compressed and converted into a file, and then recorded and stored in a recording medium of the storage section 3.

A touch display section 6 in FIG. 1 includes a transparent touch operation section 6b laminated on a display section 6a such as a high-definition liquid crystal, in which various software keys (icons and touch keys) such as an A button and a B button described later are allocated and arranged. This touch display section 6 senses a touch operation by a finger or the like and inputs an operation signal in response to the touch operation. The display section 6a serves as a monitor screen (live view screen) for displaying a captured image (live view image) in real time or a replay screen for replaying a captured image. An orientation detection section 7 in FIG. 1 is structured to have an acceleration sensor which detects the orientation of the camera so as to judge, for example, whether the housing of the camera is in the landscape orientation (landscape composition) or in the portrait orientation (portrait composition) for image capturing.

FIG. 2A to FIG. 2F are diagrams showing specific examples when a part of an original image is clipped and displayed in place of the original image such that it has the same display size as that of the original image.

Figures 2A, 2B, 2C:
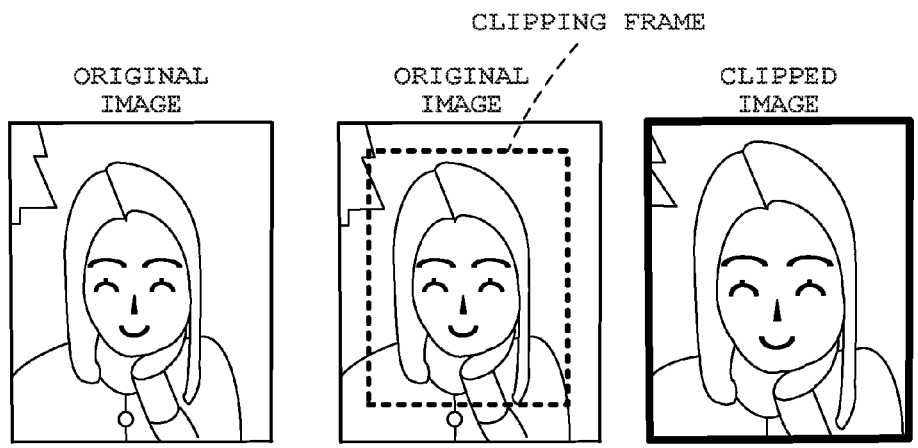
FIG. 2A to FIG. 2F are diagrams showing specific examples when a part of an original image is clipped and displayed in place of the original image such that it has the same display size as that of the original image.

In FIG. 2A, an image captured when the camera is in the portrait orientation (portrait composition) has been set as an original image. (In the shown example, it is a rectangular image, and the same applies hereafter.) When an instruction to clip a part of this original image for enlarged display is given by a user operation, the control section 1 detects a feature portion (face portion) of the original image by analyzing it, and sets, on the original image, a clipping frame (in the shown example, a rectangular virtual frame) for clipping while centering on the feature portion (face portion).

The size of this clipping frame varies depending on the size of the feature portion (face portion) of an image. For example, the size of the shown clipping frame in the longitudinal direction is 1.5 times as long as the length of the face area in the longitudinal direction. However, the size of the clipping frame may be changed in accordance with the size of the feature portion (face portion) of the image, within a predetermined range from a maximum size (80% of the original image size) to a minimum size (50% of the original image size). Alternatively, the size of the clipping frame may be a fixed size (for example, 60% of the original image size), irrespective of the size of the feature portion (face portion) of the image. Still alternatively, a configuration may be adopted in which the size of the clipping frame can be arbitrarily specified by the user. Also, a configuration may be adopted in which whether or not to enable the enlarged display of a clipped image (whether or not to display the B button described below on the touch display section) can be arbitrarily specified by the user.

Note that this face detecting function is a technique generally used in cameras, and the present invention uses this known technique. Accordingly, specific description of the face detecting function is omitted herein. Also, the above-described clipping frame is not limited to a rectangular frame, and may be a circular, oval, or hexagonal frame. Alternatively, a configuration may be adopted in which the shape of the clipping frame can be arbitrarily specified by the user.

FIG. 2B shows a state in which the clipping frame (the longitudinally-elongated rectangular frame indicated by the broken line in the shown example) has been set on the original image. Here, since the face portion (feature portion) is positioned at a center portion of the original image, the clipping frame is also set at the center portion of the original image. In this state, the control section 1 clips an image in the clipping frame from the original image, and causes the clipped image to be displayed in place of the original image such that it has the same display size as that of the original image. As a result, as shown in FIG. 2C, the image of the face portion (feature portion) is displayed with it being enlarged as compared to the case of FIG. 2A.

In the enlarged display (switching display) of the clipped image, the control section 1 controls the display of the clipped image so that the position of this clipped image on the original image is identifiable. That is, the control section 1 first compares each of the upper, lower, left, and right edges of the clipped image (rectangular image) with each of the upper, lower, left, and right edges of the original image (rectangular image). Subsequently, based on the comparison result, the control section 1 specifies, from among the directions of the edges of the clipped image, the direction of an edge that does not coincide with any of the edges of the original image as a direction in which a remaining portion that has not been clipped from the original image (a portion not targeted for clipping) is present. Then, the control section 1 causes the clipped image to be displayed such that the edge in this specified direction is identifiable. Note that the above-described edge coinciding is edge coinciding that is equal to or larger than a predetermined threshold. That is, the edge coinciding is not limited to a case in which edges completely coincide with each other and includes a case in which edges are adjacent to each other and substantially coincide with each other (edge coinciding equal to or larger than a predetermined threshold).

The clipped image in FIG. 2C is an image acquired by the center portion being clipped from the original image shown in FIG. 2A. Here, none of the edges of the clipping frame (clipped image) coincide with the edges of the original image, as shown in FIG. 2B. Therefore, all the four sides are subjected to identifiable display (edge lines are displayed using bold lines: intensified display). By this configuration where the thickness of an edge line of a clipped image is changed, it is clearly indicated that a portion not targeted for clipping is present on its original image in that edge direction.

Figures 2D, 2E, 2F:
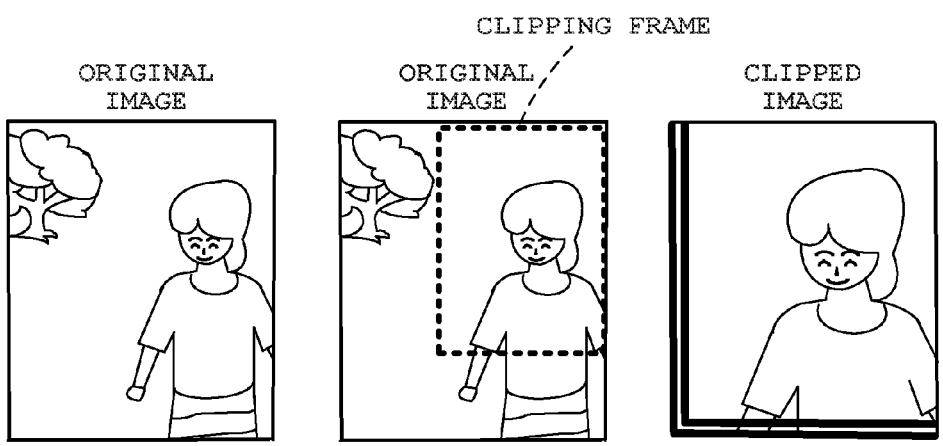

FIG. 2D shows another original image different from that of FIG. 2A described above. When an instruction for partial clipping is given by a user operation, the control section 1 detects a face portion (feature portion) from the original image in FIG. 2D, and sets a clipping frame (in the shown example, a longitudinally-elongated rectangular frame indicated by a broken line) on the original image, as with the case described above. FIG. 2E shows a state in which the clipping frame has been set. Here, because the feature portion (face portion) is present on an upper-right portion of the original image, the clipping frame is set on the upper-right portion of the original image.

In this state, the control section 1 clips an image in the clipping frame from the original image, and causes the clipped image to be displayed in place of the original image such that it has the same display size. As a result, the clipped image is enlarged and displayed, as shown in FIG. 2F. In this case, as a result of comparison between the upper, lower, right, and left edges of the clipped image and the upper, lower, right, and left edges of the original image, the right edge and the upper edge of the clipped image and the right edge and the upper edge of the original image coincide with each other by a value equal to or larger than a predetermined threshold. The left edge and the lower edge of the clipped image do not coincide with those of the original image. Accordingly, these two edges are displayed by being intensified with bold lines (identifiable display), whereby it is clearly indicated that an image portion not targeted for the clipping is present in these edge directions, as shown in FIG. 2F.

When performing the intensified display (identifiable display) of edges of a clipped image with bold lines as described above, the control section 1 identifies the image amount (area) of a portion of its original image not targeted for the clipping, in the directions of the edges not coinciding with any of the upper, lower, left, or right edges of the original image, and causes the clipped image to be displayed such that the image amount not targeted for the clipping is identifiable. That is, the control section 1 judges whether the image amount not targeted for the clipping is equal to or larger than a predetermined value (for example, 1/8 of the original image). When the image amount is smaller than the predetermined threshold, the control section 1 does not perform identifiable display in accordance with the image amount. When the image amount is equal to or larger than the predetermined threshold, the control section 1 performs identifiable display in accordance with the image amount. In the case of FIG. 2F, the control section 1 judges that an image amount in the directions of the left edge and the lower edge of the clipped image are equal to or larger than the predetermined threshold, and therefore causes the left edge and the lower edge to be displayed by intensified display with two bold lines so as to clearly indicate that the image amount not targeted for the clipping is equal to or larger than the predetermined threshold.

Next, the operation concept of the image display apparatus (digital camera) in the present embodiment is described with reference to flowcharts shown in FIG. 3 and FIG. 4. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. FIG. 3 and FIG. 4 show a flowchart outlining the operation of the characteristic portion of the present embodiment from among all of the operations of the image display apparatus (digital camera). After exiting this flow of FIG. 3 and FIG. 4, the control section 1 returns to the main flow (omitted in the drawing) of the overall operation.

FIG. 3 and FIG. 4 show the flowcharts for describing an operation (characteristic operation of the present embodiment) of the digital camera which is started when a current mode is switched to a replay mode. In the following descriptions, the flowcharts shown in FIG. 3 and FIG. 4 are specifically described with reference to display examples of FIG. 5A to FIG. 5D, FIG. 6A, and FIG. 6B.

First, when a current mode is switched to a replay mode by an operation by the operating section 4, the control section 1 reads out one image (latest image) most recently captured or replayed, from among various captured images (stored images) recorded and stored in the storage section 3, and causes the read image to be displayed on the replay screen of the touch display section 6 (Step A1 of FIG. 3). Note that the present invention is not limited to this configuration where the latest one image is displayed, and a configuration may be adopted in which, when a current mode is switched the replay mode, a plurality of captured images including the latest image are converted into thumbnail images, and a list thereof is displayed.

Figure 5A:
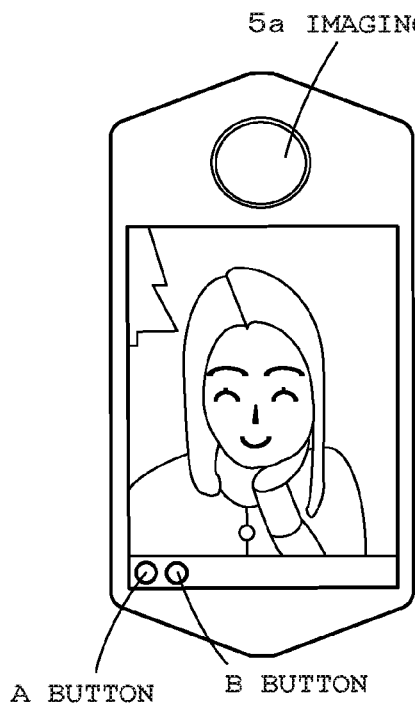
FIG. 5A to FIG. 5D are diagrams showing display examples of a replay screen whose display is changed in response to operations performed on an A button and a B button.
Figure 5B:
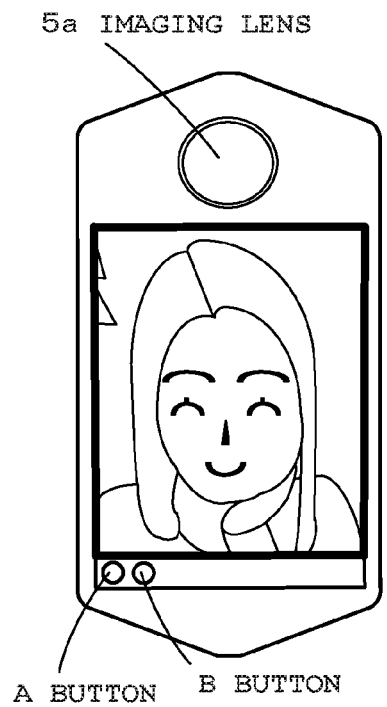

In an example in FIG. 5A, a latest image showing a person has been displayed on the replay screen. On this replay screen of the touch display section 6, various buttons (touch keys) such as the A button and the B button have been arranged and displayed on the lower side of its image display area. The A button is a button for giving an instruction to perform list display for thumbnail images, and the B button is a button for giving an instruction to clip a part of an original image and display it in place of the original image such that it has the same display size. The reference numeral "5a" in FIG. 5A denotes an imaging lens which forms the imaging section 5, and the camera housing is structured such that this imaging lens 5a can be oriented to the display screen side or its opposite side. When the imaging lens 5a is oriented to the display screen (monitor screen) side, the user can take pictures of himself or herself, that is, so-called selfies. Note that, in a configuration where a plurality of thumbnail images are displayed when a current mode is switched to the replay mode, an initial value is set in accordance with the number of matrix elements described below.

Next, after performing processing for setting an initial value of "1" for an N counter (omitted in the drawing) for updating the number of matrix elements (N×N) on a thumbnail list screen (Step A2), the control section 1 judges whether the A button has been operated (Step A3), judges whether the B button has been operated (Step A4), and judges whether a replay end operation has been performed (Step A5). Here, when judged that the A button has been operated (YES at Step A3), the control section 1 performs processing for incrementing the value of the N counter by "1" to update the value (Step A6), and then judges whether the value has reached a value equal to or larger than an upper-limit value of "4" (Step A7). In the present embodiment, the number of column elements and the number of row elements in the matrix are equal (N×N). However, the matrix may have different numbers of column elements and row elements (N×M).

When judged that the value of the N counter has reached a value equal to or larger than the upper-limit value of "4" (YES at Step A7), the control section 1 returns to the above-described Step A1 to initialize the value of the N counter. Conversely, when judged that the value has not reached a value equal to or larger than the upper-limit value of "4" (NO at Step A7), the control section 1 reads out captured images as many as the number of images (N×N) indicated by this value of the N counter (Step A8). Here, when the value of the N counter is "2", the control section 1 reads out the most recent 2×2 captured images including the latest image. When the value of the N counter is "3", the control section 1 reads out a plurality of (3×3) captured images. Then, the control section 1 reduces the size of the plurality of (N×N) captured images to generate thumbnail images, and displays a thumbnail list in an N×N form on the replay screen of the touch display section 6 (Step A9). Then, the control section 1 returns to the above-described Step A3 to enter an operation wait state. Note that, although the upper-limit value of the N counter is "4" or more herein, it may be "2" or more.

Figure 5C:
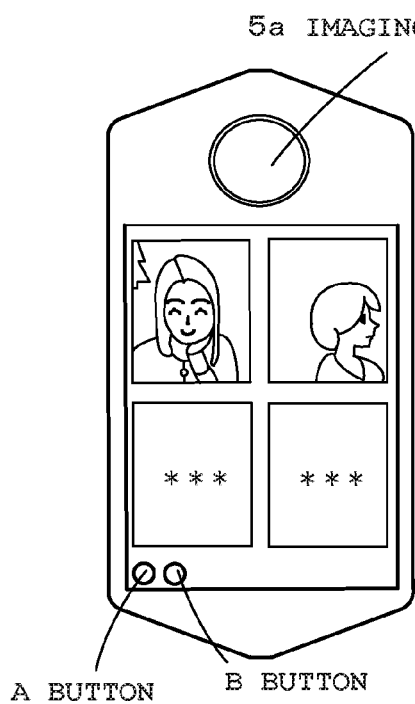
Figure 5D:
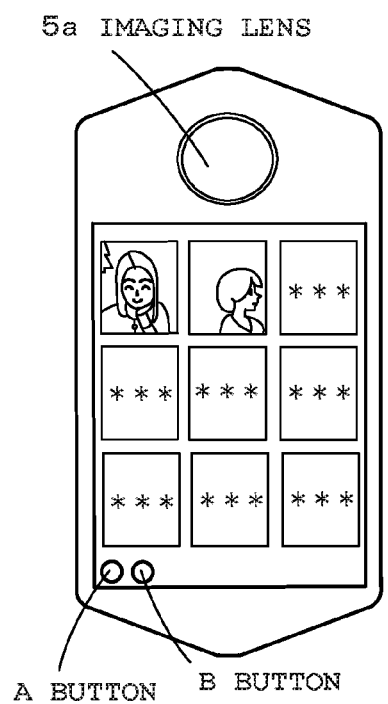

FIG. 5C shows a state where the display state (the state in which one image is being displayed, N counter=1) shown in FIG. 5A has been switched in response to a first A button operation so as to display a thumbnail list screen, whereby 2×2 captured images have been displayed as thumbnail images in a list form (N counter=2). FIG. 5D shows a state in which the display state (the state of 2×2 thumbnail list display) shown in FIG. 5C has been switched in response to a second A button operation so that 3×3 captured images are displayed as thumbnail images in a list form (N counter=3). As such, in this thumbnail image list screen, a display size per image decreases as the number of matrix elements (the number of images) increases. Therefore, depending on the imaging condition of a face portion in an image, it may be difficult to see.

Accordingly, the user operates the B button to give an instruction to perform the enlarged display of the feature portion (face portion) in the image. At Step A4, when judged that the B button has been operated (YES at Step A4 of FIG. 3), the control section 1 judges whether clipped image display has been performed (Step A10). When judged that clipped image display has not been performed as shown in FIG. 5A and FIG. 5C (NO at Step A10), the control section 1 proceeds to the flow of FIG. 4 and specifies one image from original images being displayed (Step A12). For example, in a case where one image is being displayed as shown in FIG. 5A, the control section 1 specifies this image. In a case where a plurality of images are being displayed in a matrix as shown in FIG. 5C, the control section 1 specifies the upper-left image (the image on the first row and the first column) in FIG. 5C as a first image.

Then, the control section 1 analyzes the specified original image (specified image), and detects a feature portion (human face portion) thereof (Step A13). Subsequently, the control section 1 judges whether any feature portion (human face portion) has been detected as a result of the detection (Step A14). When judged that no human face has been detected (NO at Step A14), the control section 1 proceeds to processing for specifying the next image from the images being displayed, so that the first specified image is removed from processing targets (Step A21). Then, the control section 1 judges whether another specified image is present (Step A22). Here, in a case where only one image is being displayed as shown in FIG. 5A, no specified image is present (YES at Step A22), and therefore the control section 1 returns to Step A3 of FIG. 3. In a case where a plurality of image are being displayed as shown in FIG. 5C or FIG. 5D, if the next image (for example, the image on the first row and the second column) subsequent to the current specified image (for example, the image on the first row and first column) is present (NO at Step A22), the control section 1 returns to the above-described Step A13 for face detection.

At Step A14, when judged that a feature portion (face portion) has been detected in the specified image (YES at Step A14), the control section 1 sets on the specified image a clipping frame for clipping the detected face portion, and clips and acquires an image in the clipping frame (Step A15). Next, the control section 1 causes this clipped image (clipped image) to be displayed in place of the original image being displayed such that it has the same display size as the original image (Step A16). Subsequently, the control section 1 compares the upper, lower, left, and right edges of this clipped image and the upper, lower, left, and right edges of the original image (Step A17). Then, based on the comparison result, the control section 1 specifies, from among the edges of the clipped image, the direction of an edge not coinciding with any edge of the original image as a direction in which the remaining portion not clipped from the original image (the portion not targeted for the clipping) is present (Step A18), and identifies its amount (image amount: area) not targeted for the clipping on the original image, in the direction of the edge not coinciding with any of the edges of the original image (Step A19).

Then, in order to indicate that an image not targeted for the clipping is present in the specified direction of the edge of the clipped image, the control section 1 performs the bold-line display (identifiable display) of the corresponding edge of the original image, with the number of bold lines in accordance with the image amount not targeted for the clipping (Step A20). Then, the control section 1 specifies the next image from the images being displayed (Step A21), judges whether another specified image is present (Step A22), and repeats the above-described operation. When judged at Step A22 that no next image is present, the control section 1 returns to Step A3 of FIG. 3 to enter an operation wait state. Here, when the B button is operated (YES at Step A4), since clipped images are being displayed (YES at Step A10), the control section 1 returns the clipped images being displayed to the original images, performs processing for canceling the bold-line display (Step A11), and then returns to the above-described Step A3 to enter an operation wait state.

Figure 6A:
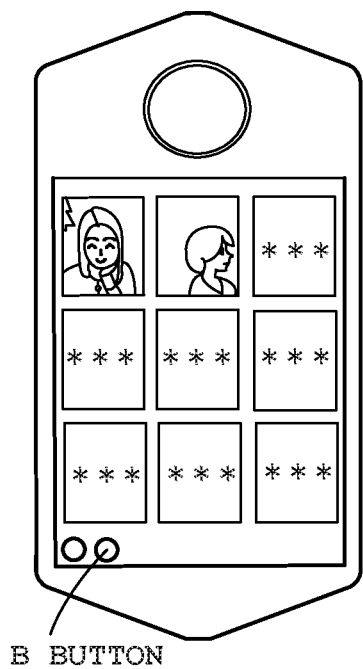
FIG. 6A and FIG. 6B are diagrams showing display examples of the replay screen whose display is changed in response to an operation performed on the B button.
Figure 6B:
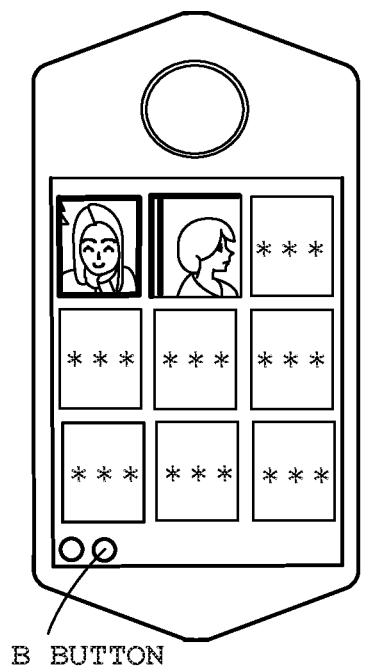

FIG. 6A shows a thumbnail list screen similar to that of FIG. 5D, and FIG. 6B shows a thumbnail list screen after the B button is operated with the thumbnail list screen of FIG. 6A being displayed. In contrast to each thumbnail image shown in FIG. 6A, each thumbnail image shown in FIG. 6B is displayed by being enlarged centering on its face portion. That is, the respective thumbnail images shown in FIG. 6B are images of feature portions (face portions) collectively clipped from the respective thumbnail images shown in FIG. 6A and enlarged to the same display size as the original thumbnails for list display.

As described above, in the present embodiment, the control section 1 performs control of displaying a plurality of different original images in a list form on the touch display section 6. Then, in response to the detection of a second instruction operation (B button operation) by the user, the control section 1 clips a part of at least one of the plurality of different original images displayed in the list form, acquires the clipped image, and performs control of displaying the clipped and acquired image in place of the original image displayed in the list form and subjected to the clipping, with the display size of the original image being maintained. As a result of this configuration, an image display size in list display can be easily adjusted.

Also, the control section 1 performs control of displaying a clipped image such that the clipping position on its original image that is the clipping source is identifiable. As a result of this configuration, how an image size has been adjusted in list display can be confirmed.

Moreover, the control section 1 performs control of displaying a plurality of different images in a list form on the touch display section 6 and, every time a first instruction operation (A button operation) by the user is detected, performs control of switching the current list display to list display where a plurality of different images whose number is more than that of the currently displayed images are displayed in a list form at a display size smaller than the display size of the currently displayed images. As a result of this configuration, the number of images in list display can be more easily adjusted.

Furthermore, the control section 1 clips a part of at least one of a plurality of different images displayed in a list form in response to the detection of the second instruction operation (B button operation) by the user, and acquires the clipped image. Then, the control section 1 performs control of displaying the clipped and acquired image in place of the image displayed in the list form and subjected to the clipping, with the display size of the image being maintained. As a result of this configuration, an image display size in list display can be easily adjusted.

Still further, the control section 1 performs control of displaying a plurality of different images in a list form on the touch display section 6 by arranging them in a matrix where the number of elements in the column direction and the number of elements in the row direction are equal. Then, every time the first instruction operation (A button operation) by the user is detected, the control section 1 performs control of switching the current list display to list display where a plurality of different images whose number is more than that of the currently displayed images are displayed on the touch display section 6 such that the number of matrix elements in this list display is more than the number of the matrix elements in the current list display. As a result of this configuration, an image display size in list display can be easily adjusted.

Yet still further, the control section 1 clips a part of one of a plurality of different original images with the original images being displayed in a list form, and acquires the clipped image. Then, the control section 1 performs control of displaying the clipped and acquired image in place of its original image such that the clipping position on the original image subjected to the clipping is identifiable. As a result of this configuration, the positional relation of a clipped portion with respect to its original image can be easily grasped by the user.

Yet still further, the control section 1 judges whether the edges of a clipped image on its original image and the upper, lower, left, and right edges of this original image coincide with each other, and performs control of displaying the clipped image such that the coinciding status of the edges is identifiable. As a result of this configuration, it can be clearly indicated whether an image portion not targeted for clipping is present in the direction of each edge of a clipped image.

Yet still further, the control section 1 performs control of displaying a clipped image such that, from among the directions of the edges of the clipped image on its original image, the direction of an edge that does not coincide with any of the upper, lower, left, and right edges of the original image is identifiable. As a result of this configuration, it can be clearly indicated whether an image portion not targeted for clipping is present in that direction.

Yet still further, the control section 1 identifies the image amount of a portion of an original image not targeted for clipping, in the direction of an edge of a clipped image not coinciding with any of the upper, lower, left, and right edges of the original image, and performs control of displaying the clipped image such that this identified image amount is identifiable. As a result of this configuration, the user can know the image amount of a portion of an original image not targeted for clipping.

Yet still further, the control section 1 performs control of displaying a clipped image in place of its original image in the same display size. As a result of this configuration, a clipped image can be enlarged to the display size of its original image for display.

Yet still further, every time the first instruction operation (A button operation) is performed, the control section 1 causes images to be displayed in a list form in a display size smaller than that at the time of the previous instruction operation. As a result of this configuration, when a plurality of different original images are being displayed in a list form, the number of displayed original images can be increased every time the A button is operated.

Yet still further, in response to the second instruction operation (B button operation), the control section 1 performs control of displaying clipped images acquired by clipping a part of each image of a plurality of different original images that are being displayed in place of the original images in the same display size. As a result of this configuration, images acquired by parts of original images in list display being collectively clipped can be displayed in a list form in a manner to be enlarged to the same display size as that of the original images. Accordingly, when selecting a desired image from a plurality of images in list display, the user can easily find this desired image.

In the above-described embodiment, the display of a clipped image and the normal display of an original image are switched every time a B button operation is performed. However, a configuration may be adopted in which a clipped image displayed in place of its original image is taken as an original image for the next instruction operation, which allows continuous clipping where a part of a clipped image is further clipped and displayed.

First Modification Example

In the above-described embodiment, in response to an A button operation in clipped image display after a B button operation, the clipped image display is cancelled and switched to the list display of thumbnail images including more matrix elements (images) (Step A6 to Step A9 of FIG. 3). However, a configuration may be adopted in which clipped image display is switched to the list display of thumbnail images including more matrix elements (images) with the clipped image display being maintained.

In the flowchart of this configuration, a flag for indicating whether clipped images are being displayed is provided (whose initial value indicates that clipped images are not being displayed), and the control section 1 sets a value of this flag in accordance with a result of judgment at Step A10 of FIG. 3 whether clipped images are being displayed. After Step A9, when it is indicated by the value of this flag that clipped images are being displayed, the control section 1 performs processing from Step A12 of FIG. 4 until a judgment at Step A22 is YES.

Second Modification Example

In the above-described embodiment, initial image display (Step A1 of FIG. 3) is normal image display showing no clipped image. However, a configuration may be adopted in which a clipped image is displayed in initial image display. This applies to a configuration where initial image display is thumbnail list display.

In the flowchart of this configuration, after Step A1 of FIG. 3, the control section 1 performs processing from Step A12 of FIG. 4 until a judgment at Step A22 is YES.

Third Modification Example

Figure 7A:
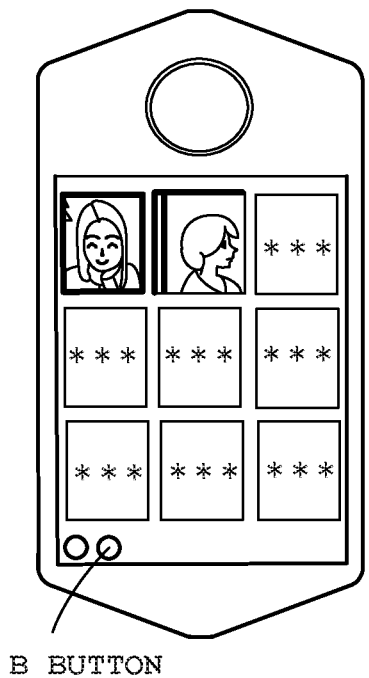
FIG. 7A and FIG. 7B are diagrams for describing <Third Modification Example> of the embodiment where enlarged display can be selected from among those at a plurality of stages, in which display examples thereof are shown.
Figure 7B:
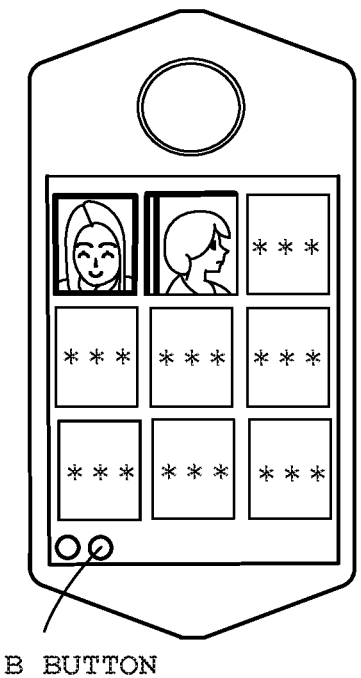

In the above-described embodiment, the clipping size is a fixed size or variable size, and whether to perform clipping is selectable. However, a configuration may be adopted in which the clipping size is selectable at a plurality of stages. FIG. 7A and FIG. 7B show display examples when the clipping size is selectable at two stages.

In the flowchart of this configuration, in place of Step A10 of FIG. 3, the control section 1 counts the number of times of B button operations with the number of matrix elements in thumbnail display being maintained. When a first B button operation is performed, for example, the control section 1 sets the size of the clipping frame in the longitudinal direction 1.6 times as long as the length of a face area in the longitudinal direction. When a second B button operation is performed, for example, the control section 1 sets the size of the clipping frame in the longitudinal direction 1.2 times as long as the length of the face area in the longitudinal direction. When a third B button operation is performed, the control section 1 returns the display to the original image display, and clears the count of the number of times of B button operations. Then, at Step A15 of FIG. 4, the control section 1 clips the face area from its original image at a ratio set in accordance with the number of times of B button operations. FIG. 7A shows a display example when the size of the clipping frame in the longitudinal direction is 1.6 times as long as the length of a face area in the longitudinal direction, and FIG. 7B shows a display example when the size of the clipping frame in the longitudinal direction is 1.2 times as long as the length of the face area in the longitudinal direction.

Note that the size of the clipping frame varies depending on the size of the feature portion (face portion) of an image. In this third modification example, the size of the clipping frame in the longitudinal direction is 1.6 times or 1.2 times as long as the length of a face area in the longitudinal direction. However, for example, a configuration may be adopted in which the size of the clipping frame is changed at two stages in accordance with the size of the feature portion (face portion) of an image, within a predetermined range from a maximum size (80% of the original image size) to a minimum size (50% of the original image size). Alternatively, a configuration may be adopted in which the size of the clipping frame is a fixed size (for example, 75% and 50% of an original image size) irrespective of the size of the feature portion (face portion) of an image.

Also, the number of clipping stages is not limited to two, and may be three or more. Also, even when one image is being displayed, the clipping size may be similarly selectable at a plurality of stages. Moreover, a configuration may be adopted in which the size of the clipping frame and the number of clipping stages can be specified by the user.

As described above, the control section 1 clips a part of at least one of a plurality of different original images displayed in a list form while changing the size of the part to be clipped from the original image every time the second instruction operation (B button operation) by the user is detected, and acquires the clipped image. Then, the control section 1 performs control of displaying the clipped and acquired image in place of the original image subjected to the clipping, with the display size being maintained. As a result of this configuration, the contents of images in list display can be easily adjusted.

Fourth Modification Example

In the above-described embodiment, the case has been exemplarily described in which only one feature portion (face portion) is in one original image. However, the present invention can applied in a case where a plurality of feature portions (face portions) are in one original image.

Figure 8A:
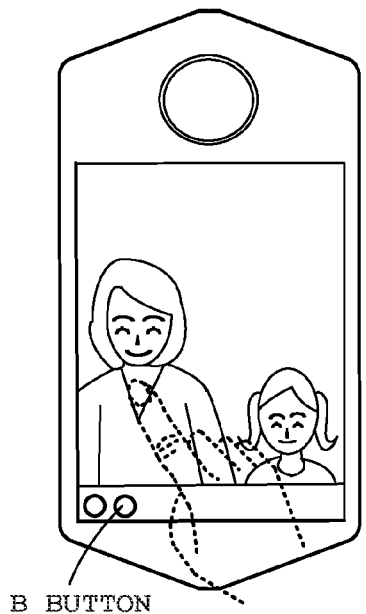
FIG. 8A to FIG. 8D are diagrams for describing <Fourth Modification Example> of the embodiment, which show display examples of a replay screen whose display is changed in response to an operation performed on the B button.

FIG. 8A exemplarily shows a case in which two persons are in one original image displayed on the replay screen of the touch display section 6 (the number of face portions is two). After touching the display position of one of the plurality of persons displayed on the original image so as to specify this person, the user operates the B button. As a result, the control section 1 detects the face portion of the person at the touched position, sets a clipping frame on the original image with the face portion being at the center, clips an image in this clipping frame, and causes the clipped image to be displayed in place of the original image in the same display size as that of the original image.

Figure 8B:
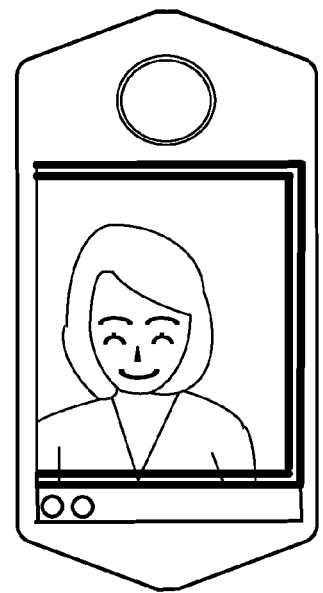
Figure 8C:
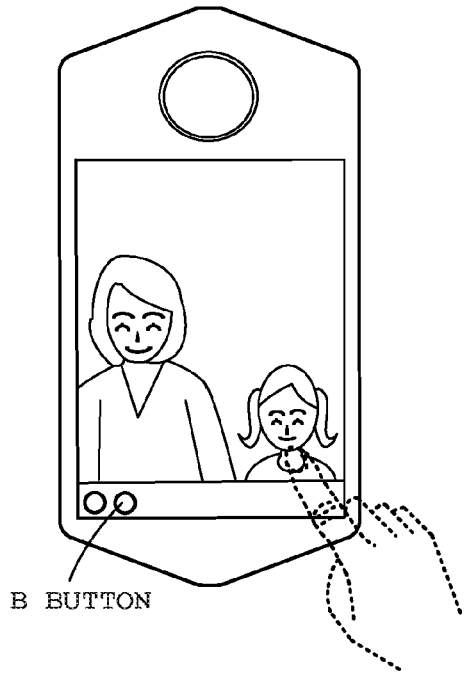
Figure 8D:
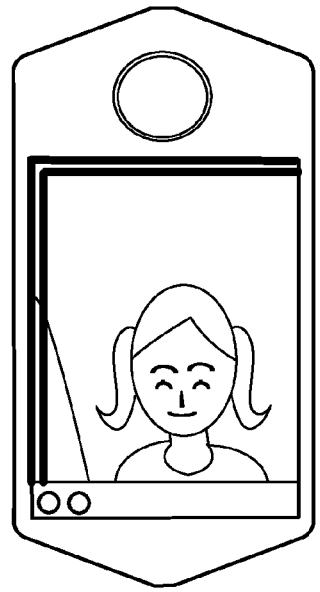

In FIG. 8A, on the original image including a parent and a child, the display position of the parent has been touched. FIG. 8B is a display example after the display position of the parent is touched and the B button is operated, in which an image has been displayed which shows an enlarged face portion of the parent at the center. In FIG. 8C, on the original image including the parent and the child, the display position of the child has been touched. FIG. 8D is a display example after the display position of the child is touched and the B button is operated, in which an image has been displayed which shows an enlarged face portion of the child at the center. In these cases as well, on the display of each clipped image, identifiable display (bold-line display) indicating that a portion not targeted for the clipping is present on the original image and identifiable display (the number of bold lines) indicating the image amount of this portion not targeted for the clipping are performed, as shown in FIG. 8B and FIG. 8D. When a B button operation is performed in this state where the clipped image is being displayed as shown in FIG. 8B and FIG. 8D, display may be returned to the original image of FIG. 8A and FIG. 8C including the parent and the child.

In the display examples of FIG. 8A and FIG. 8B, the case has been exemplarily described in which the faces of a plurality of persons are in one original image. However, the above-described processing may be performed in a case where a plurality of original images are being displayed in a list form in a matrix. In this case as well, it is only required that the display position of a desired person is touched.

Also, in the display examples of FIG. 8A to FIG. 8D, the display position of a desired person is touched. However, a configuration may be adopted in which, every time a B button operation is performed, a plurality of persons in one original image are sequentially specified for enlarged display. For example, in the case of the original image of FIG. 8A showing the parent and the child, the face of the parent is enlarged and displayed by a first B button operation as shown in FIG. 8B, the face of the child is enlarged and displayed by a second B button operation as shown in FIG. 8D, and the display is returned by a third B button operation to the original image of FIG. BA showing the parent and the child.

Also, in the configuration where a plurality of persons in one original image are sequentially specified, the size of each face portion may be detected, and these persons may be automatically specified in descending order of that size without any user operation. Alternatively, the sequence of the faces may be detected, and these persons may be automatically specified in a predetermined sequence. Also, a configuration may be adopted in which, in the case where a plurality of faces of persons are in one original image, a displayable number of face portions are enlarged and displayed, and the other face portions that cannot be displayed are displayed by a user operation such as scrolling. Moreover, a configuration may be adopted in which a face image is registered in advance, and this image is displayed preferentially.

As such, in the case where a plurality of faces of persons are in one original image, that is, in the case where a plurality of feature portions are detected in one original image, the control section 1 performs control of clipping each feature portion from the original image and causing these different clipped images to be displayed in place of the original image in the same display size. As a result of this configuration, it is possible to extract a face portion of one person from among a plurality of persons for enlarged display.

Fifth Modification Example

Figure 9A:
FIG. 9A and FIG. 9B are diagrams for describing <Fifth Modification Example> of the embodiment, which show display examples of a replay screen whose display is changed in response to an operation performed on the B button.
Figure 9B:
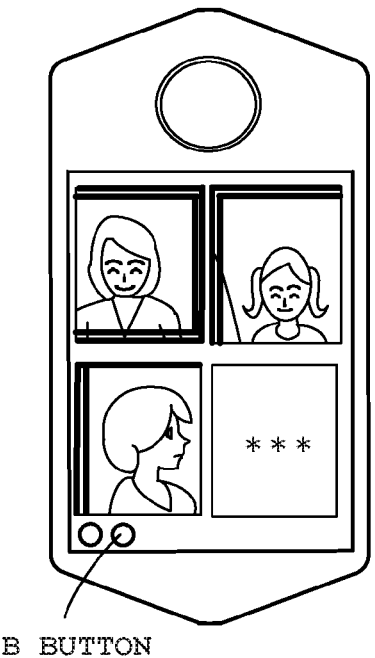

In <Fourth Modification Example> of the embodiment described above, every time a B button operation is performed, a plurality of persons in one original image are sequentially specified for enlarged display. However, a configuration may be adopted in which, in response to a B button operation, a plurality of enlarged images acquired by images of a plurality of persons in one original images being clipped are arranged at once for display. FIG. 9A shows a display example when two persons are in one original image in 2×2 thumbnail list display on the replay screen of the touch display section 6 (when the number of face portions is two), and FIG. 9B shows a display example when enlarged display of the face of the parent and enlarged display of the face of the child are performed side by side in response to a B button operation by the user. In this configuration, by a B button operation, the enlarged display of FIG. 9B is returned to the display of the original image of FIG. 9A showing the parent and the child. Also, in order to indicate which enlarged images are from the same one original image, the color, line type, and the like of the bold-line display (identifiable display) of the enlarged images may be changed for each original image. Also, in FIG. 9A and FIG. 9B, the 2×2 thumbnail list display has been shown as an example. However, in the case of one image display, display where the number of matrix elements are 2×2 may be temporarily performed so that enlarged images are displayed side by side.

As such, in response to the detection of the second instruction operation (B button operation) by the user, the control section 1 clips different parts from at least one of a plurality of different original images displayed in a list form, and acquires a plurality of different clipped images. Then, the control section 1 performs control of displaying the plurality of different clipped images in place of the original images with the display size of the plurality of different original images being maintained. As a result of this configuration, the contents of images in list display can be more easily confirmed.

In addition, the control section 1 performs control of displaying, on the touch display section 6, the plurality of different images clipped from one original image in a list form such that the plurality of different clipped images are identifiable as having been clipped from the same original image. As a result of this configuration, the relations between the contents of images in list display and their original images can be easily confirmed.

Sixth Modification Example

In the above-described embodiment, the A button for giving an instruction to perform list display of thumbnail images and the B button for giving an instruction to clip a part of an original image and display the clipped image in place of the original image in the same display size are provided. However, the functions of these A button and B button may be achieved by one button (C button).

Figure 10A:
FIG. 10A to FIG. 10C are diagrams for describing <Sixth Modification Example> of the embodiment, which show display examples of a replay screen whose display is changed in response to an operation performed on a C button.
Figure 10B:
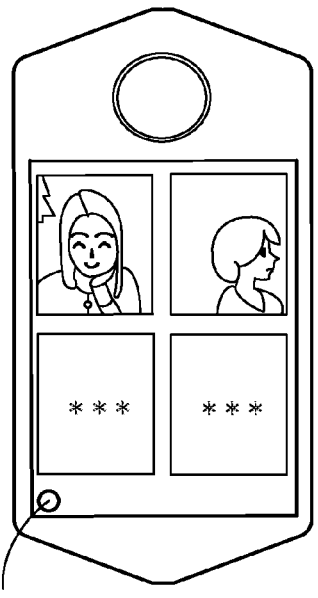
Figure 10C:
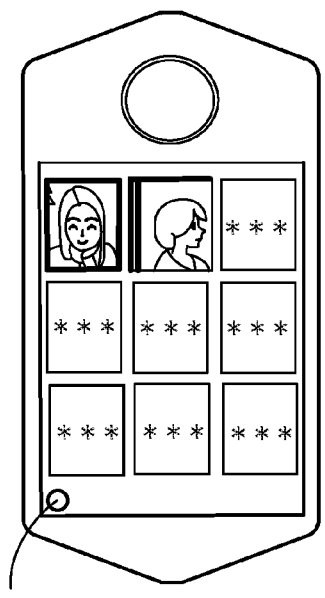
Figure 11:
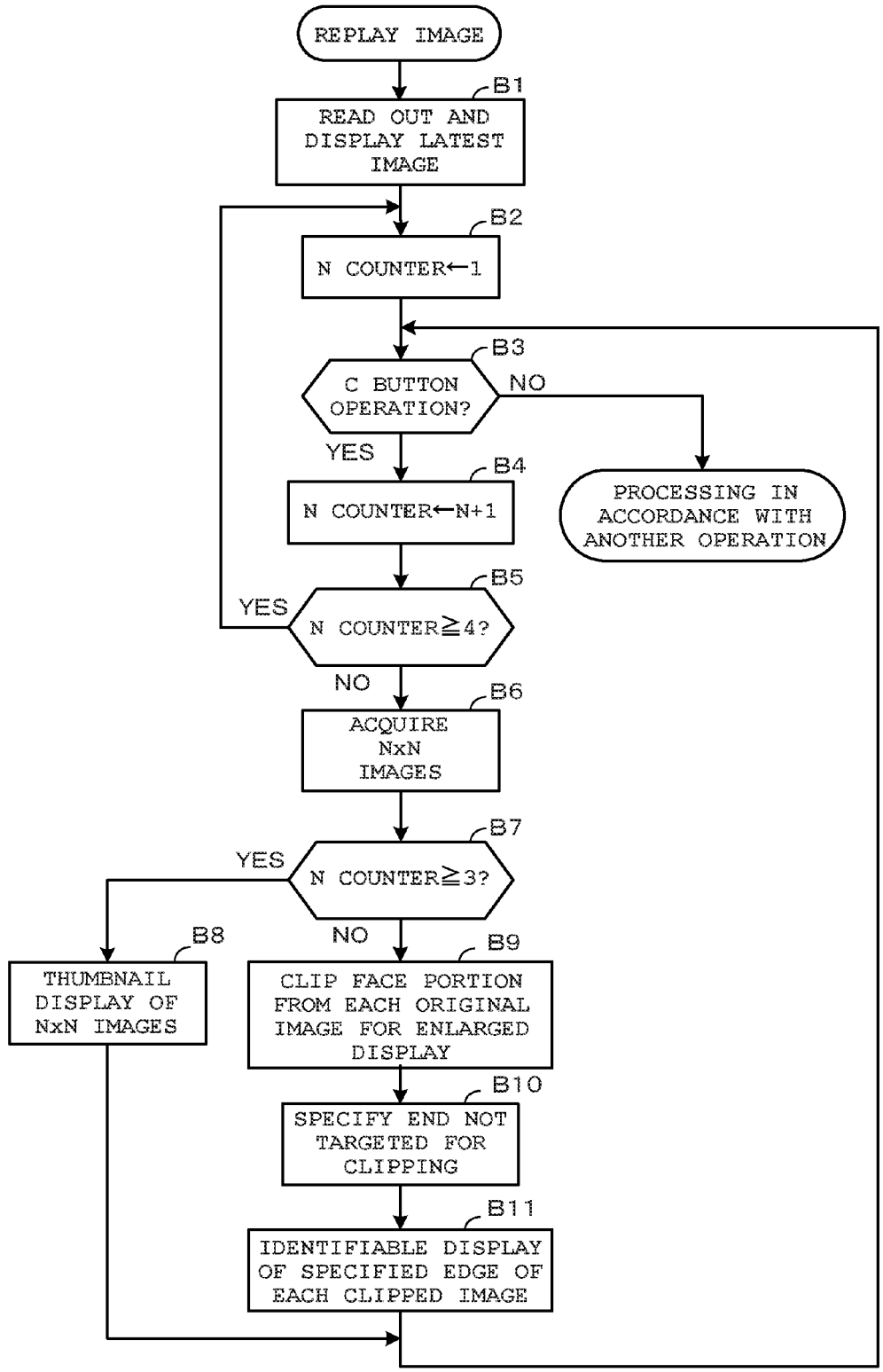
FIG. 11 is a diagram for describing <Fifth Modification Example> of the embodiment, and is a flowchart of an operation during image replay.

FIG. 10A to FIG. 10C show display examples in a configuration where the functions of the A button and the B button have been achieved by one button (C button), in which a replay screen is shown which is changed in response to an operation of this C button. FIG. 11 is a flowchart outlining the operation of image replay in this case.

First, when a current mode is switched to a replay mode, the control section 1 reads out the most recent captured or replayed image (the latest image) from among various captured images (stored images) recorded and stored in the storage section 3, and displays the read image on the replay screen of the touch display section 6 (Step B1). FIG. 10A is a diagram showing a display example of this latest image. On the replay screen of the touch display section 6, a C button that is one of the above-described various buttons (touch keys) is arranged and displayed on the lower side of an image display area. At Step B2, after performing processing for setting an initial value of "1" for the N counter (omitted in the drawing) for updating the number of matrix elements on a thumbnail list screen (Step B2), the control section 1 judges whether the C button has been operated (Step B3). When judged that an operation other than a C button operation has been performed such as a replay end operation (NO at Step B3), the control section 1 proceeds to processing in accordance with this operation. When judged that the C button has been operated (YES at Step B3), the control section 1 performs processing for incrementing the value of the N counter by "1" to update the value (Step B4), and then judges whether the value has reached a value equal to or larger than an upper-limit value of "4" (Step B5).

Here, when judged that the value of the N counter has reached the upper-limit value of "4" (YES at Step B5), the control section 1 returns to the above-described Step B2 to initialize the value of the N counter. Conversely, when judged that the value is smaller than "4" (NO at Step B5), the control section 1 reads out captured images as many as the number of images (N×N) indicated by this value of the N counter (Step B6). Then, the control section 1 judges whether the value of the N counter is equal to or larger than "3" (Step B7). Here, when the value of the N counter is "2" (NO at Step B7), the control section 1 reduces the size of the most recent 2×2 captured images including the latest image to generate thumbnail images, and performs 2×2 thumbnail list display on the replay screen of the touch display section 6 (Step B8). FIG. 10B shows a display example when the C button is operated in the display status of FIG. 10A. Then, the control section 1 returns to the above-described Step B3 to judge whether the C button has been operated.

When the C button is further operated with the plurality of (2×2) thumbnail images being displayed (YES at Step B3), the control section 1 performs processing for incrementing the value of the N counter by "1" to update the value (Step B4), whereby the number of the N counter becomes "3" (YES at Step B7). Therefore, the control section 1 proceeds to processing corresponding to Steps A10 to A20 of FIG. 4 described above (Steps B9 to B11). That is, when the value of the N counter becomes equal to or larger than "3", that is, when the display size of the images on the list display becomes smaller than a predetermined size, the control section 1 performs processing for clipping a feature portion (face portion) from each original image and causing the clipped images to be displayed in the display size of the original images (Step B9). Then, the control section 1 specifies, for each clipped image, an edge not targeted for the clipping and the image amount of a portion not targeted for the clipping (Step B10), and performs processing for executing identifiable display of the specified edge of each clipped image in accordance with the image amount (Step B11).

In FIG. 10C, a list screen of these plurality of (3×3) thumbnail images are shown. In contrast to each thumbnail image shown in FIG. 10B, each thumbnail image shown in FIG. 10C is an image clipped centering on a face portion and enlarged for display. On the display of each thumbnail image, identifiable display (bold-line display) indicating that a portion not targeted for the clipping is present on the original image and identifiable display (the number of bold lines) indicating the image amount of that portion not targeted for the clipping have been performed, as shown in FIG. 10C. Then, the control section 1 returns to the above-described Step B3. When the C button is further operated, the value of the N counter becomes "4" (YES at Step B5), and therefore the control section 1 returns to the above-described B2 to initialize the value of the N counter.

As such, when images currently displayed in a list form are original images, the control section 1 clips a part of each original image in response to the detection of the first instruction operation (C button operation) by the user, and acquires the clipped images. Then, the control section 1 performs control of displaying the clipped and acquired images in place of the original images, at a display size smaller than the display size of the original images. As a result of this configuration, the number and contents of images in list display can be appropriately adjusted.

Also, when images currently displayed in a list form are images clipped from original images, the control section 1 clips a part of each original image in response to the detection of the first instruction operation (C button operation) by the user in a manner that the clipping size of each part is different from the clipping size at which the currently displayed images have been clipped, and acquires the clipped images. Then, the control section 1 performs control of displaying the clipped and acquired images in the list form at a display size smaller than the display size of the currently displayed images. As a result of this configuration, the number and contents of images in list display can be appropriately adjusted.

Also, the control section 1 performs the above-described control of acquiring the clipped images and displaying them on the touch display section 6 only when a judgment is made that the display size of a plurality of images to be displayed in a list form is smaller than a predetermined size. As a result of this configuration, the number and contents of images in list display can be more easily adjusted.

In this modification example, every time the C button is operated, the control section 1 causes each of a plurality of different original images to be displayed in a list form with the same display size that is smaller than that at the time of the previous C button operation. Here, when it is detected that the display size becomes smaller than a predetermined size, the control section 1 performs control of displaying each clipped image acquired by clipping a part of each original image in place of each original image with the same display size. As a result of this configuration, effects similar to those of the above-described embodiment can be acquired and, when an image display size in list display becomes smaller than a predetermined size, enlarged display of feature portions (face portion) can be performed without a B button operation, unlike the above-described embodiment.

Note that, although an image display size in list display in this example becomes smaller than a predetermined size when the value of the N counter is equal to or larger than "3", the value of the N counter herein may be equal to or larger than "2".

Seventh Modification Example

In the above-described embodiment, a feature portion (face portion) of one type is clipped for enlarged display. However, a configuration may be adopted in which a plurality of feature portions, such as a face portion and a plant portion, are selected as clipping targets, and the selected feature portions are clipped for enlarged display.

Figure 12A:
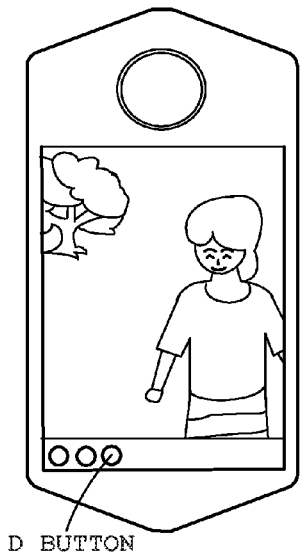
FIG. 12A to FIG. 12F are diagrams for describing <Seventh Modification Example> of the embodiment, which show display examples of a replay screen whose display is changed in response to an operation performed on a D button.
Figures 12B, 12C, 12D:
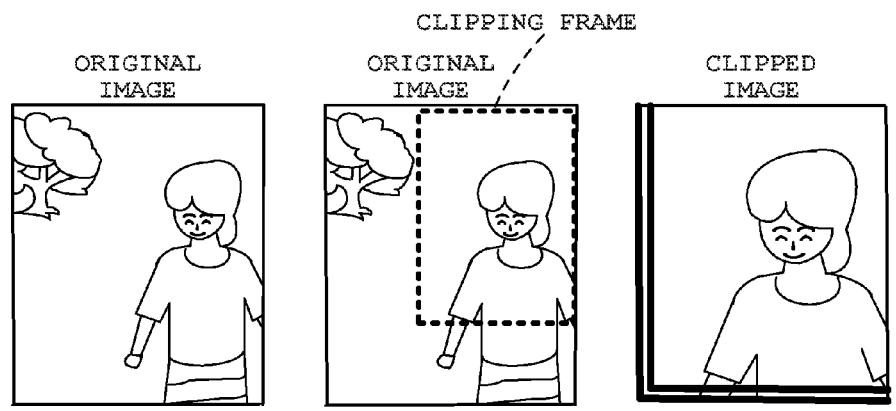
Figures 12E, 12F:
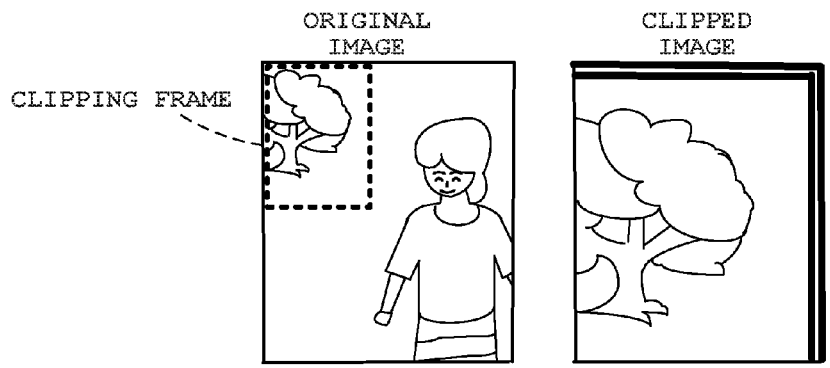

In the example of FIG. 12A, in contrast to the above-described embodiment, a D button for performing an operation of switching to (selecting) a different type of feature portion has been further added to the touch display section 6 and displayed. FIG. 12B shows a display example when two types of feature portions (a face portion and a plant portion) are in one original image, and FIG. 12C shows a state in which a clipping frame (the longitudinally-elongated rectangular frame indicated by the broken line in the shown example) when the face portion is selected as a feature portion has been set on the original image. In this state, the control section 1 clips an image in the clipping frame from the original image, and causes the clipped image to be displayed in place of the original image in the same display size as that of the original image. That is, the face portion is enlarged and displayed as shown in FIG. 12D, as compared to that of FIG. 12B. FIG. 12E shows a state in which a clipping frame (the longitudinally-elongated rectangular frame indicated by the broken line in the shown example) when the plant portion is selected as a feature portion has been set on the original image.

In this state, the control section 1 clips an image in the clipping frame from the original image, and causes the clipped image to be displayed in place of the original image in the same display size as that of the original image. That is, the plant portion is enlarged and displayed as shown in FIG. 12F, as compared to that of FIG. 12B. Here, since the positional relation of the clipping frame with respect to the original image is different between FIG. 12D and FIG. 12F, the bold-line display (identifiable display) in FIG. 12D and the bold-line display (identifiable display) in FIG. 12F are different.

In a flowchart for this case, after a judgment "NO" is made at Step A4 of FIG. 3, the control section 1 judges whether the D button has been operated via the touch operating section 6. When judged that the D button has been operated, the control section 1 judges whether clipped image display has been performed, as with Step A10. When judged that clipped image display has not been performed, the control section 1 regards this operation as invalid, and returns to Step A3. Conversely, when judged that clipped image display has been performed, the control section 1 judges whether a currently selected feature portion is a face portion. When judged that it is a face portion, the control section 1 performs processing for switching this feature portion to a plant portion. When judged that it is not a face portion (that is, when it is a plant portion), the control section 1 performs processing for switching the feature portion to a face portion. Then, for the feature portion of the selected type, the control section 1 performs processing from Step A12 of FIG. 4 until a judgment "YES" is made at Step A22. Here, the switching to another type of feature portion is not performed by the operations of the A button and the B button, and processing similar to that of the above-described embodiment is performed with the feature portion of the currently-selected type being maintained. That is, the control section 1 detects a feature portion (face portion or plant portion) of the original image by analyzing it, and clips this feature portion (face portion or plate portion) at the center.

Note that the number of selectable feature portions is not limited to two and may be three or more.

Also, any type of feature portion is selectable within a range where it can be processed by a known technology.

In the display examples of FIG. 12B to FIG. 12F, the case has been exemplarily described in which two types of feature portions (face portion and plant portion) are in one original image. However, the above-described processing can be performed in a case where a plurality of original images are displayed in a matrix in a list form. In this case as well, a feature portion of a selected type is clipped for enlarged display.

As such, the control section 1 clips a feature portion of a selected type from an original image so as to acquire a first clipped image, and performs control of displaying the first clipped image in place of the original image, with the display size of the original image being maintained. Subsequently, the control section 1 selects a different type of feature portion from the original image in response to the detection of the second instruction operation (D button operation) by the user, and clips the selected feature portion of the different type so as to acquire a second clipped image. Then, the control section 1 performs control of displaying the second clipped image in place of the first clipped image, with the display size of the first clipped image being maintained. As a result of this configuration, the contents of images in list display can be easily adjusted in accordance with a desired type of feature portion.

Eighth Modification Example

Figure 13A:
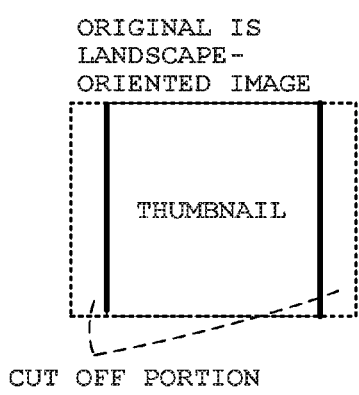
FIG. 13A to FIG. 13C are diagrams for describing <Eighth Modification Example> of the embodiment, which exemplarily show a case where an original image is in a rectangular shape and an image clipped therefrom is in a square shape.
Figure 13B:
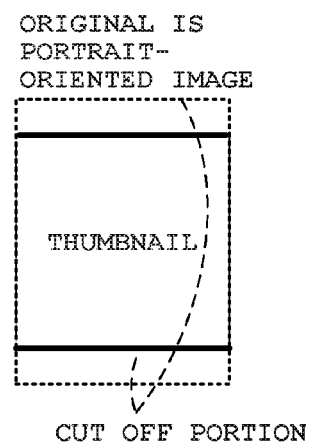

In the above-described embodiment, rectangular images are displayed as thumbnail images in list display. In general, when thumbnail images are to be displayed in list display on a smartphone (multifunctional portable phone), portions of a portrait-oriented original image (original image in portrait composition) in the vertical direction (longitudinal direction) are cut off to generate a square image as shown in FIG. 13A, and portions of a landscape-oriented original image (original image in landscape composition) in the horizontal direction (lateral direction) are cut off to generate a square image as shown in FIG. 13B. However, there is a problem in that, when a thumbnail image is displayed in a square shape as described above, whether its original image is a portrait-oriented image or landscape-oriented image cannot be visually recognized.

Figure 13C:
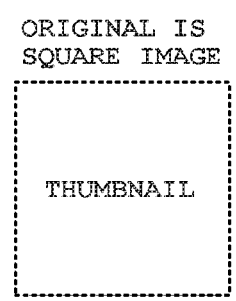

However, this problem can be solved by a configuration in which, when each thumbnail image is displayed in a square shape as described above, edges not targeted for clipping are specified for each of these clipped images and subjected to identifiable display (for example, bold-line display) as shown in FIG. 13A and FIG. 13B, whereby whether their original images are portrait-oriented images or landscape-oriented images can be visually and easily recognized. FIG. 13C shows a case where an original image has a square shape. In this case where an original image has a square shape, the above-described cut processing is not performed, and therefore the above-described identifiable display (bold-line display) is not performed, whereby the user can visually recognize that this original image has a square shape.

In the above-described embodiment, among the edges of a clipped image, an edge in a direction not coinciding with any of the upper, lower, left, and right edges of its original image (direction not targeted for clipping) is specified. When this specified edge is to be displayed in an identifiable manner, it is displayed using a bold line. However, instead of the thickness of the edge line, the type of the line may be changed (for example, a dotted line or a one-dot chain line). Also, the display color of the line may be changed, the line may be blinked, or a mark may be added.

Also, in the above-described embodiment, in order to judge the image amount of a portion not targeted for clipping, a predetermined threshold at one stage is provided. However, thresholds at a plurality of stages may be provided. In this configuration, the number of bold lines may be three or more in accordance with a referenced predetermined threshold. Also, instead of this configuration where the number of bold lines is changed, a configuration may be adopted in which a wavy line is displayed along a bold line.

Moreover, in the above-described embodiment, an edge not targeted for clipping is displayed in an identifiable manner as described above. However, the direction of the edge may be displayed in an identifiable manner. For example, an arrow mark may be displayed near the edge not targeted for clipping, or gradations may be provided such that brightness increases at positions closer to the edge.

Furthermore, the above-described embodiment, images clipped from a plurality of thumbnail images (original images) are collectively enlarged and displayed. However, a configuration may be adopted in which, when an arbitrary image is selected by a user operation from among a plurality of thumbnail images, and an instruction for partial-clipping display (enlarged display) is given, the selected image and the other remaining original images are collectively subjected to clipping display (enlarged display), or only other original images related to the selected image are collectively subjected to clipping display (enlarged display). This applies to the case of the movement of a clipping frame. That is, a configuration may be adopted in which, when a clipping frame set on an arbitrary image selected by a user operation is moved, this clipping frame set on the selected image and clipping frames that are set on the other original images are moved. As a result of this configuration, the display of an image selected by a user operation and the display of other images can correspond to each other.

Still further, in the above-described embodiment, images clipped from the plurality of thumbnail images (original images) are collectively enlarged and displayed. However, a configuration may be adopted in which, for example, the face of a person is registered in advance, and a face portion is clipped from an original image including the registered face and enlarged for display. By this configuration, only a face desired by the user (registered face) can be enlarged and displayed. Also, instead of the configuration where a face is registered in advance, a configuration may be adopted in which gender is detected by image analysis, and a face portion is clipped in accordance with the gender and enlarged for display.

Yet still further, in the above-described embodiment, an image clipped centering on a detected face from an original image is enlarged and displayed. However, for example, in the case of an imaging apparatus tailored to handheld selfie, an upper-half portion of an image where a face portion is positioned may be enlarged and displayed with priority under the assumption that the composition of waist shot or bust shot is acquired. Here, by a portion being clipped which is located at the center in the horizontal direction and away from the upper edge by a distance corresponding to ⅓ of the image, and this portion being enlarged and displayed, the processing from face detection to clipping can be simplified.

In the above-described embodiment, the present invention has been applied in a digital camera as an image display apparatus. However, the present invention is not limited thereto, and may be applied in a personal computer, a PDA (persona digital assistant), a tablet terminal apparatus, a portable phone such as a smartphone, an electronic game player, a musical player, and the like.

Yet still further, the "apparatuses" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image display apparatus comprising:
a display unit; and
a processor that is configured to:
perform control of displaying a plurality of different original images in a list form on the display unit;
clip a part of at least one of the plurality of different original images displayed in the list form in response to detection of a second instruction operation by a user;
acquire a clipped image; and
perform control of displaying the clipped and acquired image in place of an original image displayed in the list form and subjected to the clipping, with a display size of the original image being maintained,
wherein the processor is configured to further perform control of displaying the clipped image such that a position of the clipped image, with respect to the original image from which the clipped image was clipped, is identifiable.

2. The image display apparatus according to claim 1, wherein the processor is configured to:
clip a part of at least one of the plurality of different original images displayed in the list form while changing a size of the part to be clipped from an original image every time the second instruction operation by the user is detected;
acquire a clipped image; and
perform control of displaying the clipped and acquired image in place of the original image, with a display size of the original image being maintained.

3. The image display apparatus according to claim 1, wherein the processor is configured to:
clip a feature portion of a selected type from an original image so as to acquire a first clipped image;
perform control of displaying the first clipped image in place of the original image, with a display size of the original image being maintained;
select a different type of feature portion from the original image in response to detection of a third instruction operation by the user;

clip the selected feature portion of the different type so as to acquire a second clipped image; and perform control of displaying the second clipped image in place of the first clipped image, with a display size of the first clipped image being maintained.

4. The image display apparatus according to claim 1, wherein the processor is configured to:

clip different parts from at least one of the plurality of different original images displayed in the list form, in response to detection of the second instruction operation by the user;

acquire a plurality of different clipped images; and perform control of displaying the plurality of different clipped images in place of an original image subjected to the clipping, with a display size of the original image being maintained.

5. The image display apparatus according to claim 4, wherein the processor is configured to further perform control of displaying the plurality of different images clipped from the one original image in the list form on the display unit such that the plurality of different clipped images are identifiable as having been clipped from the same original image.

6. An image display apparatus comprising:

a display unit; and a processor that is configured to:

clip a part of at least one of a plurality of different original images;

acquire a clipped image; and perform control of displaying the clipped and acquired image in a list form such that a position of the clipped image, with respect to the original image from which the clipped image was clipped, is identifiable.

7. The image display apparatus according to claim 6, wherein the processor is configured to:

judge whether edges of the clipped image on the original image in upper, lower, left, and right directions and edges of the original image in the upper, lower, left, and right directions coincide with each other;

perform control of displaying the clipped image such that a coinciding status of the judged edges is identifiable; and specify a portion of the original image in a direction of coinciding edges as a target for the clipping.

8. The image display apparatus according to claim 7, wherein the processor is configured to perform control of displaying the clipped image on the display unit such that a direction of an edge of the clipped image which does not coincide with any edge of the original image is identifiable.

9. The image display apparatus according to claim 7, wherein the processor is configured to:

identify an image amount of a portion of the original image which is not the target for the clipping; and perform control of displaying the clipped image on the display unit such that the identified image amount is identifiable.

10. An image display control method for an image display apparatus, the image display apparatus comprising a display unit and a processor, and the method comprising:

performing, by the processor, control of displaying a plurality of different original images in a list form on the display unit;

clipping, by the processor, a part of at least one of the plurality of different original images displayed in the list form in response to detection of an instruction operation by a user;

acquiring, by the processor, a clipped image;

performing, by the processor, control of displaying the clipped and acquired image in place of an original image displayed in the list form and subjected to the clipping, with a display size of the original image being maintained; and performing, by the processor, control of displaying the clipped image such that a position of the clipped image, with respect to the original image from which the clipped image was clipped, is identifiable.

11. An image display control method for an image display apparatus, the image display apparatus comprising a display unit and a processor, and the method comprising:

performing, by the processor, control of displaying a plurality of different original images in a list form on the display unit;

clipping, by the processor, a part of at least one of the plurality of different original images;

acquiring, by the processor, a clipped image; and performing, by the processor, control of displaying the clipped and acquired image on the display unit in place of an original image displayed in the list form and subjected to the clipping such that a position of the clipped image, with respect to the original image from which the clipped image was clipped, is identifiable.

* * * * *